United States Patent [19]

Seymour et al.

[11] 3,827,086
[45] Aug. 6, 1974

[54] BATHTUB AND WALL ENCLOSURE

[75] Inventors: Merrit W. Seymour, Sylvania; Jeri O. Clark, Granville, both of Ohio

[73] Assignee: Owens-Corning Fiberglas Corporation, Toledo, Ohio

[22] Filed: Jan. 26, 1972

[21] Appl. No.: 220,766

[52] U.S. Cl. .................................................. 4/175
[51] Int. Cl. ............................................. A47k 3/08
[58] Field of Search ................ 4/145, 146, 148, 173

[56] References Cited
UNITED STATES PATENTS

| | | | |
|---|---|---|---|
| 2,015,021 | 9/1935 | Samelow | 4/146 |
| 2,617,116 | 11/1952 | Voorhees | 4/148 |
| 2,626,402 | 1/1953 | Baker et al. | 4/173 |
| 2,697,231 | 12/1954 | Strand | 4/173 |
| 2,967,309 | 1/1961 | Corp | 4/173 |
| 3,088,124 | 5/1963 | Long | 4/173 |
| 3,158,237 | 11/1964 | Schooler | 4/148 X |
| 3,479,778 | 11/1969 | Johnson | 4/173 X |
| 3,557,390 | 1/1971 | Ruggles et al. | 4/148 |
| 3,574,869 | 4/1971 | Skyhawk | 4/148 |

FOREIGN PATENTS OR APPLICATIONS

| | | | |
|---|---|---|---|
| 130,158 | 7/1919 | Great Britain | 4/148 |

*Primary Examiner*—Robert W. Jenkins
*Assistant Examiner*—Donald B. Massenberg
*Attorney, Agent, or Firm*—Staelin & Overman

[57] ABSTRACT

A multi-piece glass fiber reinforced plastic bathtub and wall enclosure. The pieces being made to conform to manufacturing requirements of matched-metal die compression molding equipment. The pieces having special joint details so they interlock and overlap to form a rigid and watertight integral unit.

2 Claims, 6 Drawing Figures

BATHTUB AND WALL ENCLOSURE

BACKGROUND OF THE INVENTION

This invention relates to a multi-piece glass fiber reinforced plastic bathtub and wall enclosure which is simple in construction and capable of manufacture by matched-metal die compression molding. A bathtub and wall enclosure so provided has joints between the bathtub and wall panels which serve to interlock and align the pieces to form a watertight seal. Furthermore, there are special junctures between the individual wall panels which serve to camouflage the seams as well as shield the seams from direct contact with water spray.

There have been numerous types of glass fiber reinforced plastic bathtub and wall enclosures. The major reason for the popularity of the glass reinforced plastic bathroom fixtures is easier and faster installation. The labor cost of installing bathroom fixtures is substantial, and glass reinforced plastic products help reduce this labor cost. In particular, the multi-piece tub and wall enclosures are the most desirable because they are easier to handle and transport than the bulkier one-piece tub and wall enclosures. Also the multi-piece assembly can be installed anytime and almost any place whereas the one-piece bathtub and wall enclosure must be put into a bathroom during the construction of the bathroom.

The fiber glass reinforced bathtubs and showers to date have, because of their shape, been made exclusively by conventional spray up methods. This process yields a fine product, as evidenced by its market acceptance. However, the process is not conducive to production on a high yield basis. Furthermore, the quality of each piece depends greatly on the skill and attitude of the operator. Accordingly, it is desirable that the bathtub and wall enclosure pieces be made by a machine process such as matched-metal die compression molding. This molding process yields a high quality glass fiber reinforced plastic piece. The thicknesses are exact, the pieces are uniform, and the process operates at a faster and more efficient rate than the spray up method. However, each piece fabricated by matched-metal die compression molding must meet certain process imposed restrictions such as minimum draft, maximum thickness variations, rib placement, etc. And these restrictions are not necessarily compatible with the installation and operational requirements of a bathtub and wall enclosure which call for rigid and watertight joints, deep draw, etc. Accordingly, if a fiber glass reinforced plastic bathtub and wall enclosure could be made at the high volume production rates of matched-metal die compression molding and yet maintain or exceed the product quality of those made conventionally by the spray up method, then a substantial contribution would be made to the art.

SUMMARY OF THE INVENTION

Accordingly, a principal object of this invention is to provide a glass fiber reinforced bathtub and wall enclosure which is simple in construction, and which is relatively easy to manufacture.

Another object is to provide a multi-piece bathtub and shower stall in which the individual pieces are particularly adapted to be made by matched-metal die compression molding.

A feature of this invention is a joint which serves to interlock and align the pieces and form a watertight seal.

Another feature of this invention is a back wall panel and side wall panel juncture which serves to camouflage the seam as well as shield the seam from direct contact with water spray from the shower nozzle.

Still another feature of the invention is a recessed lower, front apron portion which returns the curved upper apron and rim to a straight line at the floor to make installation of flooring materials easier.

Other objects and advantages of the invention will be apparent from the following description of a preferred embodiment thereof, with reference being made to the drawings.

DESCRIPTION OF THE PREFERRED EMBODIMENTS

Figure 1:
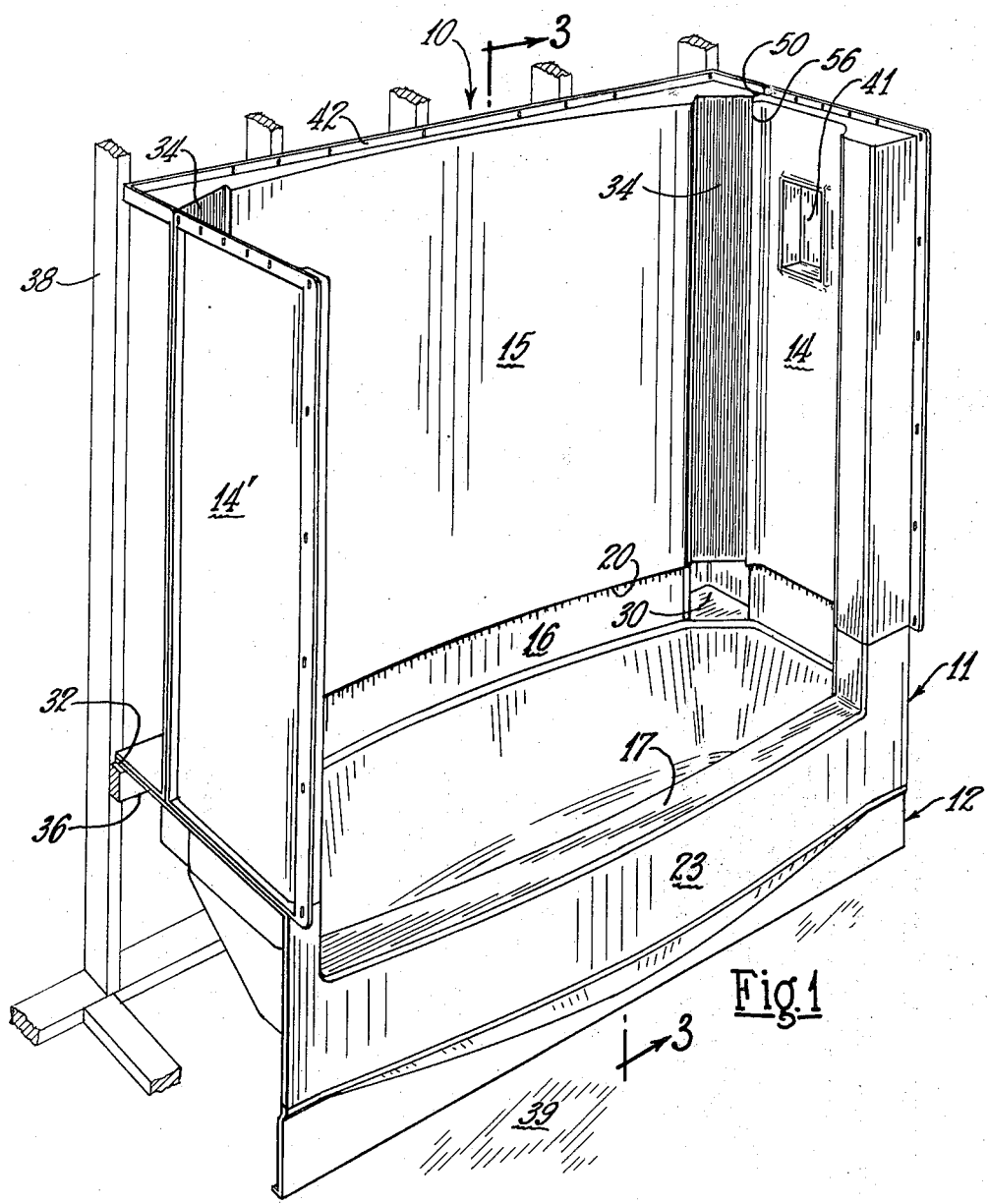
FIG. 1 is an isometric view of a multiple piece bathtub and wall enclosure built according to the teachings of this invention.
Figure 2:
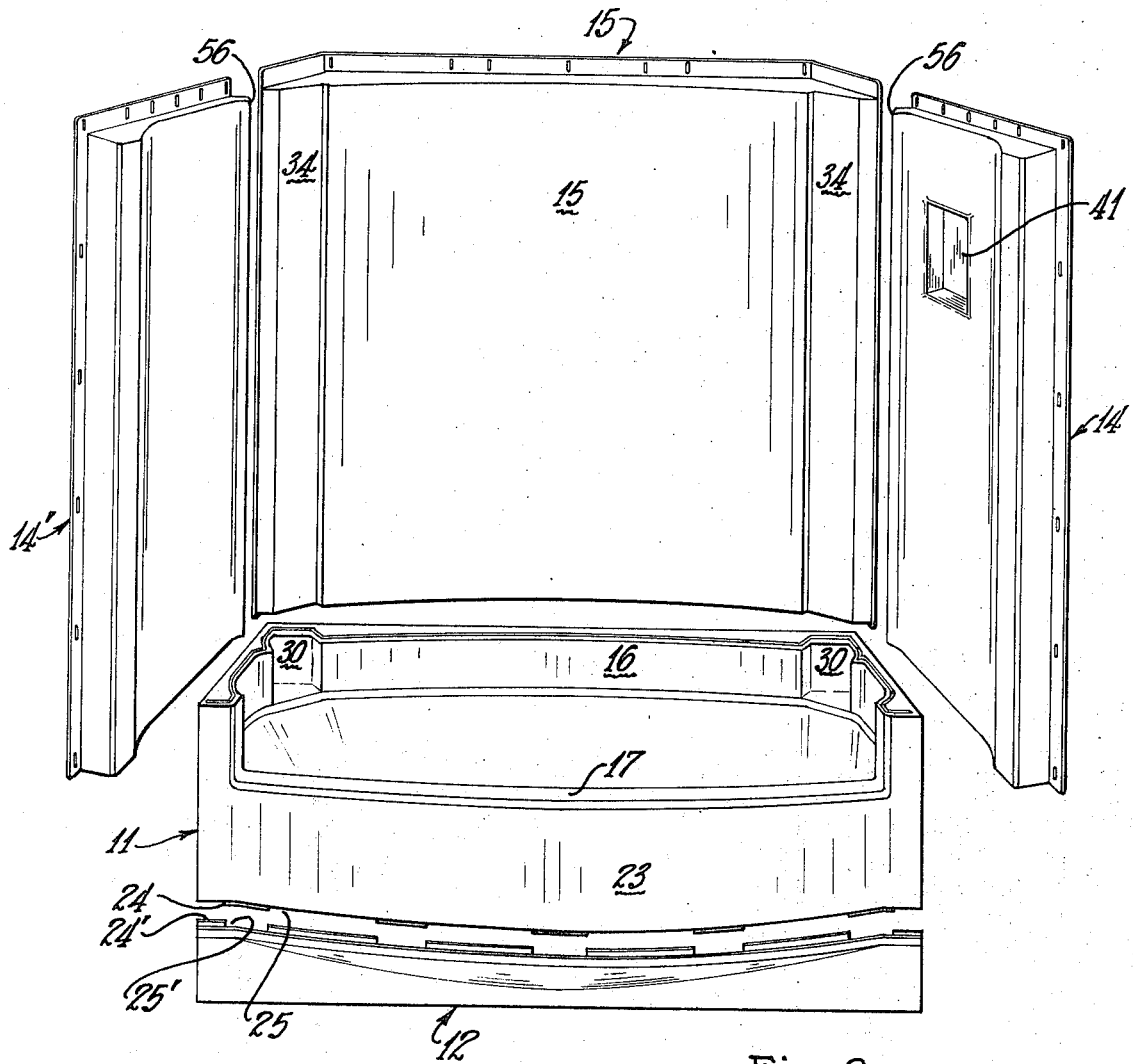
FIG. 2 is an exploded view illustrating the five separate pieces comprising the bathtub and wall enclosure.

Referring now to the drawings in detail, FIG. 1 illustrates a portion of a bathroom in the form of an assembled prefabricated bathtub and shower enclosure generally designated by the numeral 10. FIG. 2 shows the same prefabricated assembly in an exploded view. As easily seen in FIG. 2, one embodiment consists of five standardized parts. There is the bathtub 11 with a skirt extension piece 12 and wall enclosure comprised of two side wall panels 14 and 14' and a back wall panel 15.

The back vertical edge 56 of the side panels 14 and 14' extends out and overlaps the vertical joint between the side wall panels and the back wall panels 15. This projection 56 serves to hide the seam 50 from view and protect it against direct impingement by water from the shower nozzle. In a similar manner, the bottom edge of the wall panels 14, 14' and 15 projects out and over the horizontal seam 20 between the bathtub and wall panels. This projection also serves to camouflage the seam as well as shield the seam from direct impingement by water from the shower nozzle. Another major feature of the invention is the manner in which the front rim 17 of the bathtub bows out to form a larger bathtub in a given space than is possible with conventional designs. Conterminous with the curved upper apron 23 and rim 17 is a lower front skirt portion 12 which is recessed back and away from the front to return the curved upper apron and rim to a straight line at the floor 39.

Perhaps the most important feature of this invention is its method of construction. Each of the five pieces is of a shape which can be made by matched-metal die compression molding. To be fabricated by matched metal die compression molding, each piece must meet certain process imposed restrictions such as minimum draft, maximum thickness variations, rib placements, etc. Typical process parameters are set forth in the published *Fiberglas/plastic Design Guide* prepared by Owens-Corning Fiberglas Technical Center and Market Development Laboratory Design Department, Pub. No. 14–AU–5164, Litho U.S.A. Oct., 1970. Each of the pieces set forth in the preferred embodiment of this invention meets those restrictions. Furthermore, by making the five parts by the matched-metal die compression molding process, more exact details are possible than would be the case with conventional spray up processes. This exactness of form and detail are especially important to the joint configurations. Only with matched-metal dies can the joint details be made with enough precision to assure an exact and watertight fit. And, when joined together in overlapping, abutting relationship, the pieces form a single unit which is rigid and watertight as well as aesthetically pleasing.

Referring now in more detail to the bathtub 11, it is provided with the usual drain opening and overflow opening which are connected with plumbing facilities in a conventional manner. It is of a generally rectangular shape and consists of smooth contoured lines. Around the top edge of the tub, a lower wall enclosure 16 is formed to provide partial side walls and end walls; these are molded as one piece with the tub. The partial enclosure wall extends 6 to 8 inches up from the level of the bathtub rim 17 and serves to move the horizontal joint system 20 further up and away from the water level. Accordingly, the frequency of water contact with the joint connecting the upper wall and the tub is less.

Figure 4:
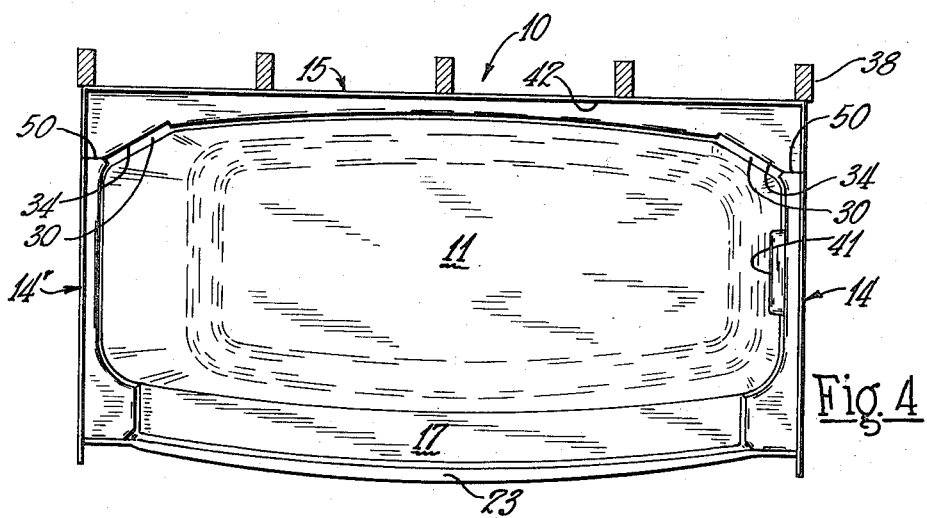
FIG. 4 is a top plan view of the bathtub and wall enclosure.

As shown in FIG. 4, there is a front apron 23 which curves out to make the inside area of the bathtub larger. At both ends of the tub, the ledge curves back so the ends of the tub are of a conventional 29 to 31 inch width. Thus, a larger volume bathtub may be fitted into a conventional wall space. Also it is possible to make the front rim 17 wider than is possible with a conventional straight rim.

Figure 3:
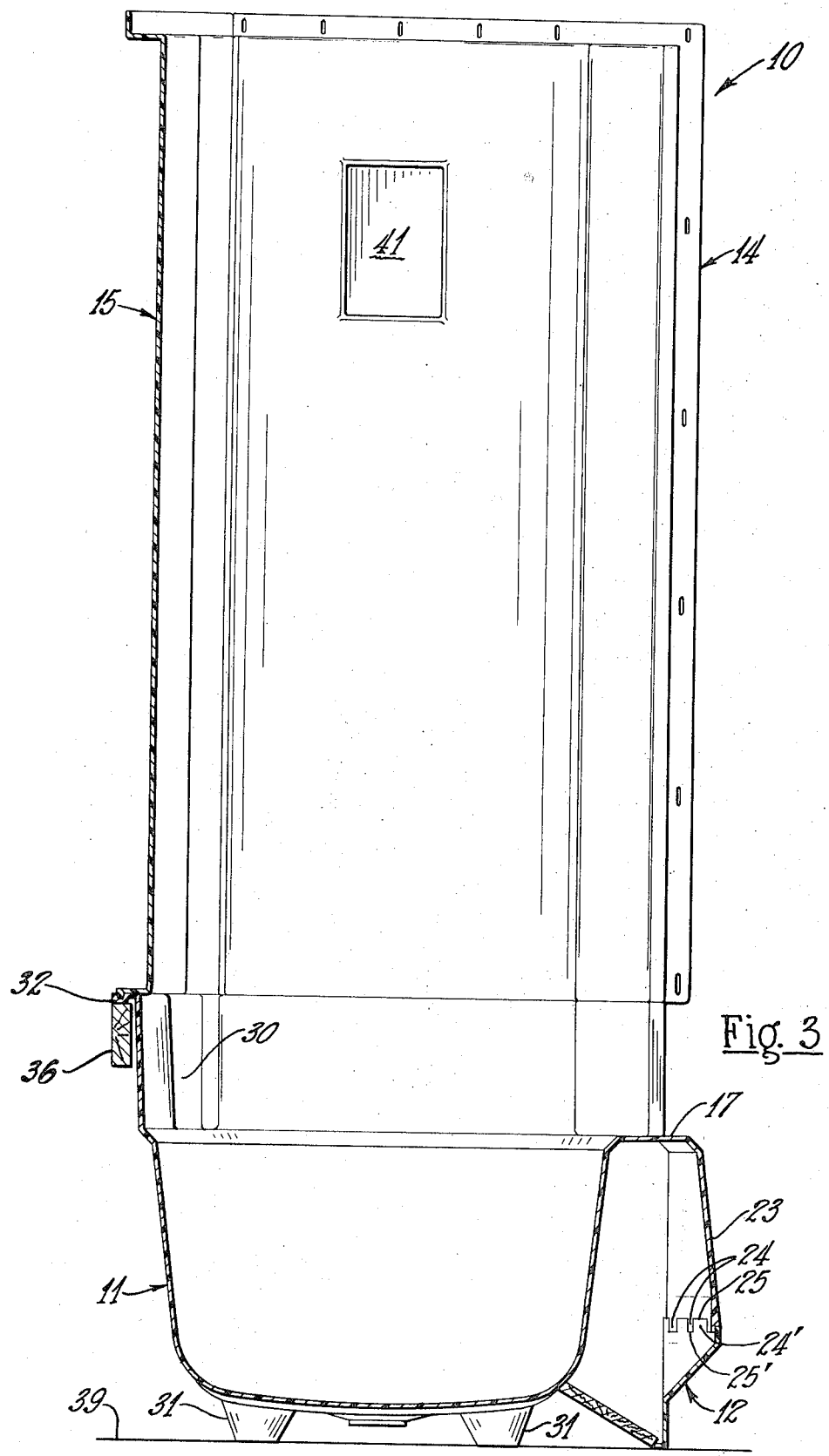
FIG. 3 is a cross sectional elevational view of a portion of the bathtub and wall enclosure, taken substantially along line 3—3 of FIG. 1.

A significant feature of this invention is the form and construction of the two piece skirt or apron as shown in FIG. 3. The upper portion of the skirt 23 projects down from the front ledge 17 and is molded as an integral piece with the tub. Because the size of the front skirt 23 is reduced, the matched metal die molding of the bathtub is easier. Molded into and depending from the lower edge of the partial skirt 23 are tapered projections 24 and slots 25 which mate with opposite slots 25' and projections 24' in the lower skirt section 12. The lower skirt section 12 is also molded as one complete piece from glass fiber reinforced plastic. Its contour along the length of its top edge is designed to match that of the upper skirt on the tub. The projections 24' and slots 25' along its upper edge interlock with those of the upper skirt section. Once they are joined together, they lock together in three directions to form a juncture which is secure and rigid. The lower skirt or apron section 12 has three main features. It forms a solid support for the front skirt 23 of the bathtub. It is recessed back from the upper apron to form a knee cove to make it easier to stand or kneel close to the tub which especially is helpful when bathing children. Finally, the lower skirt section 12 returns the curved upper apron section to a straight line where it contacts the floor 39. Thus, the job of the floor finisher or tile setter is made easier.

Other features of the illustrated embodiment of the bathtub include soap receptables 30 which may be molded into the corners of the lower wall 16. Also the bottom of the tub is preferably reinforced with molded-in ribs (not shown). In addition, the bathtub may be installed in more than one way. If the floor 39 is flat, the bathtub 11 may simply rest upon its molded-in feet 31. On the other hand where the bathroom floor is not level, a ledger strip 32 is provided for hanging the tub on a horizontally positioned board 36 which is itself attached to the wall.

The wall enclosure is made of the same fiber glass reinforced plastic as used in the bathtub. The walls are interchangeable; that is, the same pieces can be used above either a right-hand or left-hand tub. Also, with slight modifications the wall enclosure may be used above conventional bathtubs. In addition, the assembled enclosure is of a shape such that any water which runs down the walls will return to the tub. There is no path for the water to follow from the inside to the outside of the tub.

The back wall 15 consists of a smooth, contoured center portion which terminates at both the left and right sides into angular corner sections 34. These corner sections provide a flat region which is adaptable to receive decorative strips or other color overlays. Although the corner sections or accent strips 34 appear to be separate pieces, they are not. The total back section, including the angular corner pieces 34, is one integral piece. And again, the complete back wall and corner section is designed to be easily made by matched-metal die compression molding. Contributing to the strength and rigidity of the back wall section 13 are molded-in ribs (not shown). The ribs give added strength and allow the major portion of the assembly to be made of thinner fiber glass reinforced plastic without sacrificing performance. With the unit installed, the rear edge of the back wall panel is 1 ½ inches from the stud line 38. This allows conventional two-by-fours to be positioned between the back wall section and the studs. These extra two-by-fours provide the necessary anchor points and support for a variety of conventional grab bars which may be attached to the backwall.

The two side wall panels 14 and 14' are substantially alike. Each side panel has the same generally smooth center area which is characteristic of the back panel. The shape of the side panel also follows the general contour of the top ledge of the bathtub. The center area of one of the side panels contains a recessed pocket 41. The pocket is sloped from back to front to allow for proper drainage and functions as a receptacle for a bar of soap, a shampoo bottle, or other bathroom accessory.

The outer edge of the combined back wall and side wall panels is provided with an attachment or nailing flange 42 with slots molded into it. The nailing flange and slots are provided for easier attachement of the wall panels to conventional wall studs to add rigidity and strength to the entire assembly. Furthermore, slots, rather than holes, are provided to help compensate for any settling which may occur. Once the tub and shower unit is completely installed, dry wall or plaster (not shown) may overlap the flange to provide the built-in look.

Figure 6:
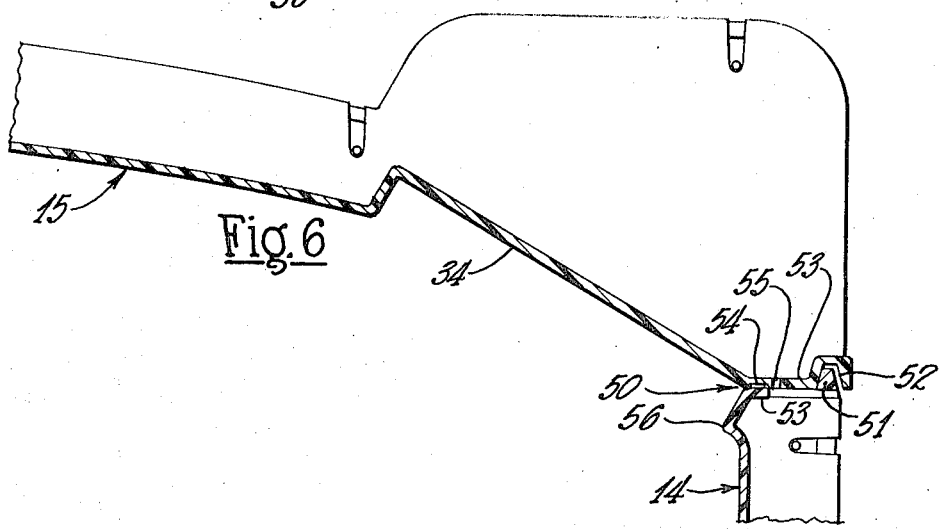
FIG. 6 is an enlarged cross sectional view of the joint detail between a back wall panel and a side wall panel of the wall enclosure.

The vertical juncture 50 between the back panel 15 and the side panels 14 and 14' has several beneficial features. The angular corner sections or accent strips 34 are molded as one piece with the rest of the back wall panel. By providing such an angular corner section, the seam or joint 50 between the back panel and the side panel is moved away from the corner to a position where an overlapping, abutting joint is more feasible. FIG. 6 shows in detail the vertical joint 50 as a tongue-in-groove arrangement which comprises a long vertical first projection or tongue 51 along the rear edge of each side wall panel 14 and 14'. This first projection mates with a corresponding vertical groove 52 which is formed along the front edge of the angular corner section 34 of the back wall panel 15. This part of the juncture serves to align the pieces and hold them in position. Adjacent this longitudinal, mating portion, on both the back and side panels, are longitudinal, planar flanges 53. These planar flanges fit flush against each other to help form a tight seal. A channel 54 is molded in one of the flanges 53 as close to the front edge as possible to provide a recess into which a sealant can be easily placed to assure a leakproof connection. Molded holes 55 are also contained in the longitudinal flanges 53 of both the side and back panels. These holes match up and provide openings through which conventional fasteners can be placed to help pull the side and back walls together and hold them securely. The final feature of this juncture is a second projection or ridge 56 also formed on the edge of the side wall panels 14 and 14'. This second projection runs parallel to the first projection and creates an overlap beyond and over the vertical joint. This overlapping relationship between the side and back wall panels provides a recessed joint which is almost completely hidden from view. Accordingly the joint is also protected by this deflecting portion from direct impingement of water from the tub or shower nozzles and thus it is less apt to collect moisture or dirt.

Figure 5:
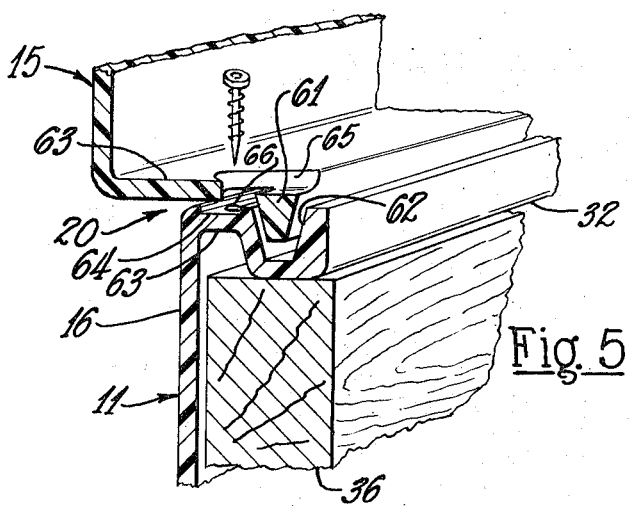
FIG. 5 is an enlarged cross sectional perspective view of the joint detail between the bathtub and the wall enclosure.

In addition to the vertical junctures between the side and back wall panels, the horizontal juncture 20 between the bathtub and the wall panels is also an important feature. FIG. 5 illustrates the juncture between the top ledge 16 of the bathtub and the bottom edge of the wall panels 14, 14' and 15. A horizontal projection or tongue 61 runs all along the bottom edge of the wall panels. It mates with a similarly continuous groove 62 formed in the upper ledge 16 of the bathtub. The groove and projection function to align the wall panels and the tub so the pieces will come together properly. Because the horizontal joint 20 runs continuously from the front edge of one side panel all the way along the back to the front edge of the other side panel, it provides a positive registering of the parts both front to back, and side to side. Also contributing to the sturdiness of the overall structure are the horizontal planar flanges 63 which run parallel to the horizontal joint. The flat flanges on the wall panels sit flush against their counterparts on the bathtub ledge. Both the continuous curved horizontal joint and the wide flanges help to make the wall panels self-supporting and free standing on the bathtub ledge. Thus, the job of the installer is much easier since he does not have to continuously hold the wall panels in place. To increase the sturdiness of the assembled unit, assembly recesses 65 and screw holes 66 are provided.

The possibility of moisture seeping into the joints is a critical problem in the construction of the bathtub and enclosure. In the present invention, because the wall panels and bathtub ledges fit flush against each other, the probability of water seeping into the joint is lessened. As an added feature, however, a sealant channel 64 is provided in the flange to assure a watertight joint. The water tightness of the juncture is further improved by the particular placement of the channel which is to contain the sealant. The channel, like the horizontal joint, runs continuously along the juncture of the wall panels and the tub. Furthermore, it is placed as close as possible to the front edge of the joint. This places the sealant as close as possible to the water thus preventing moisture from gaining entrance into the joint. As a further device to prevent water from getting into the joint, the wall panels 14, 14' and 15 project about one-half inch beyond and over the seam and joint. This overhang helps hide the joint from view. And it also prevents water from the showerhead from directly hitting the seam and joint.

As those skilled in the art will recognize from the disclosure and figures, all five pieces of this invention meet the recommended parameters of minimum draft angle, minimum inside radius, et cetera. Thus, fabrication by a matched metal die compression molding process is possible. And, in turn, the desired precision and water tight fit is also possible as a result of being able to use the matched metal die compression molding process.

Although other bathtub and wall enclosures have not been specifically shown in the drawings, it is pointed out that many other designs are possible using the structural advantages mentioned herein. Also, only glass fiber reinforced plastic has been specifically mentioned, however, bathtubs and wall enclosures of other plastic or metals would benefit by using this invention. Since it is obvious that numerous changes will readily occur to those skilled in the art, this specification is considered as illustrative only of the principles of the invention. Accordingly, it is not desired to confine the invention to the exact form herein shown and described, but it is desired to include all modifications and equivalents which may be resorted to, as properly come within the scope claimed.

We claim:

1. An enclosure for a bathing stall having a unitary recessed bottom portion joined at its upper surface by a back wall and opposed end walls to define a stall with an open front, said back wall comprising a substantially planar portion joined along a horizontal plane with said upper surface of said bottom portion and with lateral vertical edges turned inwardly towards said open front to provide vertically extending generally planar corner panels, said end walls on each end of said bottom portion comprising a substantially planar portion joined with said upper surface of said bottom portion along said horizontal plane with a vertical edge of each of said end walls turned inwardly toward the opposed end wall to define a ridge joined in a vertical plane with the opposed edge of the adjacent corner panel, said corner panel being recessed behind said back wall and said end walls to form rearwardly stepped faces along the vertical junctions thereof to provide a stepped water deflecting barrier against continuous water flow laterally along said back wall, corner panel and end wall.

2. The enclosure of claim 1 wherein the vertical junction between said end wall and said corner panel is positioned along the rearward vertical edge of said stepped face whereby a visual barrier between said junction and positions external of said enclosure is provided by said ridge.

* * * * *